(12) United States Patent
Naujoks

(10) Patent No.: US 11,293,496 B2
(45) Date of Patent: Apr. 5, 2022

(54) BEARING AND INSTALLATION AID DEVICE

(71) Applicant: AKTIEBOLAGET SKF, Gothenburg (SE)

(72) Inventor: Bernd Naujoks, Schwebheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/942,835

(22) Filed: Jul. 30, 2020

(65) Prior Publication Data
US 2021/0040993 A1    Feb. 11, 2021

(30) Foreign Application Priority Data

Aug. 7, 2019   (DE) .......................... 102019211872.0

(51) Int. Cl.
*F16C 43/04*     (2006.01)
*F16C 19/16*     (2006.01)
*F16C 41/00*     (2006.01)

(52) U.S. Cl.
CPC .............. *F16C 43/04* (2013.01); *F16C 19/16* (2013.01); *F16C 41/008* (2013.01)

(58) Field of Classification Search
CPC ...... F16C 35/063; F16C 35/067; F16C 41/00; F16C 41/04; F16C 41/008; F16C 43/04; F16C 19/183; Y10T 29/49696

USPC .................................. 29/271, 407.09, 724
See application file for complete search history.

(56) References Cited

U.S. PATENT DOCUMENTS

| | | | | |
|---|---|---|---|---|
| 2,857,179 | A * | 10/1958 | Riesing ............... | F16C 33/7856 277/376 |
| 6,957,919 | B2 * | 10/2005 | Kern ..................... | F16C 19/505 384/526 |
| 10,514,064 | B2 * | 12/2019 | White .................. | F16C 35/067 |
| 2017/0146069 | A1 * | 5/2017 | White .................... | B25B 27/00 |

* cited by examiner

*Primary Examiner* — James Pilkington
(74) *Attorney, Agent, or Firm* — J-Tek Law PLLC; Scott T. Wakeman; Mark A. Ussai

(57) ABSTRACT

A bearing configured to be installed on a shaft or in a housing in an installation direction from a rear axial end of the bearing toward a front axial end of the bearing and an installation aid device mounted to the bearing for blocking the installation of the bearing in a direction opposite the installation direction. The bearing includes a first bearing ring having a radial installation surface, a front axial end surface and a rear axial end surface and a second bearing ring. The installation aid device has at least one radial leg overlying the rear axial end surface and at least partially protruding beyond the radial installation surface and/or at least one axial leg extending at least partially along the radial installation surface.

15 Claims, 9 Drawing Sheets

BEARING AND INSTALLATION AID DEVICE

CROSS-REFERENCE

This application claims priority to German patent application no. 10 2019 211 872.0 filed on Aug. 7, 2019, the contents of which are fully incorporated herein by reference.

TECHNOLOGICAL FIELD

The present disclosure is directed to a bearing system including a bearing and an installation aid device releasably connectable to the bearing.

BACKGROUND

When installing bearings that have a fixed installation direction or installation position, for example, asymmetric bearings, it must be ensured that the bearing is installed in the correct installation position. For this purpose it is known to affix markings to the bearings, which markings indicate to the person skilled in the art the corresponding installation direction.

However, with this bearing installation aid, it is disadvantageous that the marking must be applied onto the metallic surface of the bearings, which is time and cost intensive.

Installation aids are also known that are removed prior to the actual installation, which, however, can in turn easily lead to an incorrect installing.

SUMMARY

As aspect of the present disclosure is therefore to provide an installation aid device that is easy to manufacture, is easy to remove from the bearing, and reliably ensures a correct installation.

In the following a bearing is disclosed that has a fixed installation position and a predetermined installation direction, the bearing including at least one bearing ring. Here a radial installation surface is provided on the bearing ring, and the bearing ring furthermore includes at least one first and one second axial end surface. The first axial end surface is disposed on an installation front side of the bearing in the installation direction, and the second end surface is disposed on an installation rear side of the bearing in an installation direction.

In order to ensure that the bearing is installed in the correct direction, an installation aid device is furthermore disposed on the bearing, which installation aid device includes at least one radial leg that at least partially protrudes beyond the radial installation surface of the bearing to be installed and that extends on the installation rear side along the second axial end surface of the bearing such that installing the bearing rear side first is prevented.

Alternatively or additionally the installation aid device can also include at least one axial leg that extends at least partially along the radial installation surface such that the installation is also thereby blocked at least on the installation rear side, and an installing of the bearing via the installation rear side is prevented. Here it is preferred in particular when the axial leg of the installation aid device abuts against the radial installation surface with high frictional force such that displacement of the installation aid device in the axial direction is prevented unless a force greater than a predetermined force is applied. With the use of only one axial leg it can thereby also be ensured that the installation aid device remains disposed on the installation rear side of the radial installation surface.

In other words, with, for example, an asymmetric double row bearing that is to be attached on a shaft or in a housing, the installation front side is defined as the side that should first be pushed onto the hub or introduced into the housing. On the other hand, the opposite side of the bearing is the installation rear side. The inventive installation aid device is now disposed such that it prevents the hub from being pushed into the bearing from the installation rear side, or prevents the bearing from being installed installation rear side first so that it is ensured that the rolling-element bearing is installed in the correct direction.

According to one advantageous exemplary embodiment, the installation aid device is releasably attached to the bearing. Here it is preferred in particular when the installation aid device automatically releases from the bearing during the installation. This can be achieved, for example, by attachment points being provided on the bearing, which attachment points interact with the installation aid device and attach the installation aid device to the bearing itself. During the installation of the bearing, the shaft and/or the housing on/in which the bearing is attached abuts against the installation aid device and releases it from the bearing with further movement in the installation direction. Other solution mechanisms are of course also conceivable. A manual releasing of the installation aid device during the installation itself is also possible.

According to a further advantageous exemplary embodiment, the installation aid device furthermore includes at least one axial leg that is connected to the radial leg and extends at least partially along a radial surface of the bearing. Here the axial leg can extend along the installation surface, but it is also possible that it extends along another radial surface of the bearing ring. The installation aid device can easily be attached to the bearing by this axial leg without additional attachment points for the installation aid device having to be provided.

Radial surfaces that serve for attaching the installation aid device are already present in bearings and need not be produced separately. Here it is advantageous in particular when the radial surface is the radial installation surface. The above-mentioned automatic removal of the installation aid device during the installation itself can thereby also be achieved even with bearings that are only partially installed onto the shaft or into the housing. When the bearing is installed into the housing or onto the shaft, the shaft or the housing acts on the axial leg and removes the installation aid device during the installation movement.

According to a further advantageous exemplary embodiment, the at least one axial leg is configured to attach the installation aid device to the bearing, wherein in particular two, preferably diametrically opposing, legs are provided. Here the axial leg can engage the installation aid device in an opening, configured correspondingly thereto, in the bearing ring and attach the installation aid device.

Alternatively the axial leg can also be configured as an axially projecting element that engages in attachment points formed on the bearing. The axial element can also be an elastic, axially projecting annular bead that is clamped in an elastically deformed manner in an intermediate space between an inner ring and an outer ring of the bearing.

An exemplary embodiment is advantageous in particular wherein at least two axial legs are provided that are preferably disposed with respect to each other such that they ensure an attaching of the installation aid device to the bearing ring. For this purpose the one axial leg can extend, for example, along an inner radial surface of the bearing ring, while the other axial leg extends along an outer rail surface, so that the bearing ring is enveloped over its radial extension. Alternatively or additionally the radial legs can also extend only along a radial inner side or a radial outer side, so that a jamming occurs over the entire outer or inner diameter of the bearing ring.

According to a further preferred exemplary embodiment, the radial leg is configured as an annular disc or disc. It can thereby be ensured that the radial proportion of the installation aid device reliably covers the installation opening or installation surface even in the event of a slipping.

Alternatively or additionally thereto the axial leg can be configured as a hollow- or solid-cylindrical or tube-shaped element that is preferably adapted to the radial installation surface size. Slipping of the installation aid device is thereby also reliably prevented, since no degree of freedom is available in the radial direction for movement of the installation aid device.

Since the installation aid device is an arbitrarily shaped element and often a disposable item, it is particularly preferred when easily workable materials, such as, for example, plastic, are used for the installation aid device. Here it is also preferred when the materials used are recycled, recyclable, and/or easily biodegradable, so that the disposable article does not further burden the environment. Here in particular the use of a compostable plastic or of a compostable paper material, such as, for example, cardboard, is preferred.

The use of such an installation aid device is advantageous in particular with an asymmetric bearing, since a certain installation position must necessarily be maintained here.

Such asymmetric bearings arise in particular in rolling-element bearings such that a rolling-element bearing, in particular an asymmetric rolling-element bearing, including an above-described installation aid device, is preferred.

A further aspect relates to an installation aid device for a bearing, in particular an asymmetric rolling-element bearing.

Further advantages and advantageous embodiments are specified in the description, the drawings, and the claims. Here in particular the combinations of features specified in the description and in the drawings are purely exemplary, so that the features can also be present individually or combined in other ways.

In the following the invention will be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figure 1:
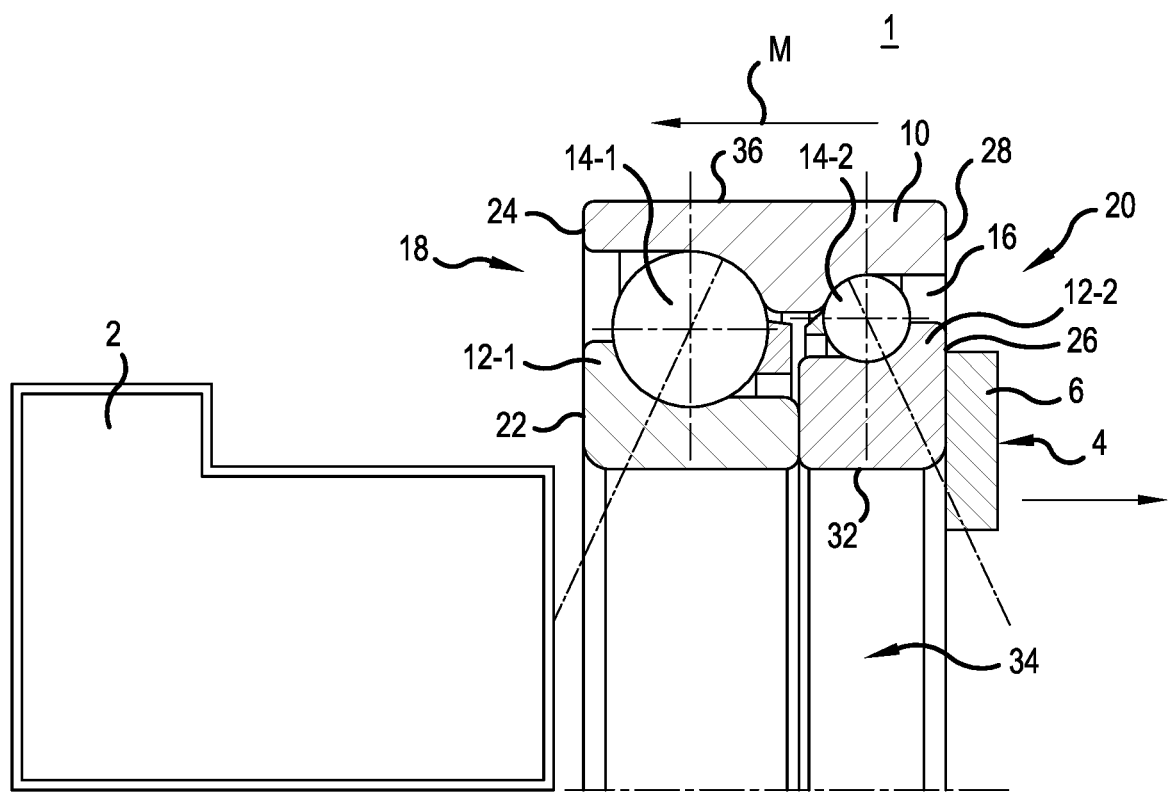
FIG. 1 is a schematic sectional view through a bearing that includes an installation aid device according to a first exemplary embodiment.

In the following, identical or functionally equivalent elements are designated by the same reference numbers.

FIGS. 1 to 8 each respectively show a sectional view of a bearing 1 configured to be installed onto a shaft 2. The bearing shown here is depicted, by way of example, as an asymmetric rolling-element bearing. Furthermore, various exemplary embodiments of a so-called installation aid device 4 are depicted in FIGS. 1 to 8, which exemplary embodiments include at least one radial leg 6 and at least one axial leg 8 (see FIGS. 4 to 8).

Asymmetric rolling-element bearing 1, as depicted in FIGS. 1 to 8, has a predetermined installation position, and it must be ensured that the bearing 1 is installed onto the shaft 2 or into a housing (not depicted) in the correct installation direction (see arrow M).

As usual, the rolling-element bearing 1 includes an outer ring 10, a pair of inner rings 12-1, 12-2, and rolling elements 14-1, 14-2 that are disposed in a radial space 16 between the inner rings 12-1, 12-2 and outer ring 10. In the exemplary embodiment depicted, the rolling-element bearing is configured as an asymmetric rolling-element bearing, wherein the diameter of the rolling elements (in this case balls) is different. Thus the rolling elements 14-1 are larger in diameter than the rolling elements 14-2. Furthermore, the exemplary embodiment shown does not include a single-part inner ring, but rather a two-part inner ring 12-1, 12-2, in order to correspondingly receive the differently sized rolling elements 14-1, 14-2. However, such an asymmetric rolling-element bearing cannot be installed in an arbitrary direction onto the shaft or into a housing, but rather must be installed along the installation direction M.

However, this also means that in installation direction M the rolling-element bearing 1 includes an installation front side 18 and an installation rear side 20, wherein the bearing is first installed by its installation front side 18 onto the shaft 2 or into the housing. The installation rear side 20 is opposite the installation front side 18 and can, for example, be subjected to a force, for example, using a tool, in order to move the rolling-element bearing 1 in installation direction M.

As can furthermore be seen from FIGS. 1 to 8, the inner ring 12-1 includes an axial end surface 22 on the installation front side 18, and the outer ring 10 includes an axial end surface 24 on the installation front side 18. Analogously, on the installation rear side 20, the inner ring 12-2 includes an axial end surface 26, and the outer ring 10 includes an axial end surface 28.

The rolling-element bearing 1 furthermore comprises a radial inner surface 32 that is provided via the bore 34 in the inner rings 12-1, 12-2 and a radial outer surface 36 that represents the radial outer surface of the outer ring 10. These radial surfaces 32, 36 usually also comprise installation surfaces such that the radial inner surface 32 comes into contact with the shaft 2 or the radial outer surface comes into contact with the housing. However, it is also possible that only one of the radial surfaces 32, 26 is configured as an installation surface.

In order to ensure that the installation rear side of the bearing is not first installed onto the shaft 2 or into the housing, the installation aid device 4 is disposed on the installation rear side 20 and configured such that its radial leg 6 extends along one or both axial end surfaces 26, 28 of the inner ring 12-2 or outer ring 10, and protrudes past one or both of the radial surfaces 32, 36. Here the radial surface past which the radial leg protrudes is also preferably the same as the installation surface. However, this is not necessarily necessary, since during installation other elements can also abut against the radial protrusion of the radial leg 6 and prevent an incorrect installation of the bearing 1.

In the following, for the sake of simplicity, the principle of the installation aid device is explained using an exemplary embodiment wherein the radial leg 6 protrudes past the radial installation surface itself so that an installation from this side is prevented.

Figure 2:
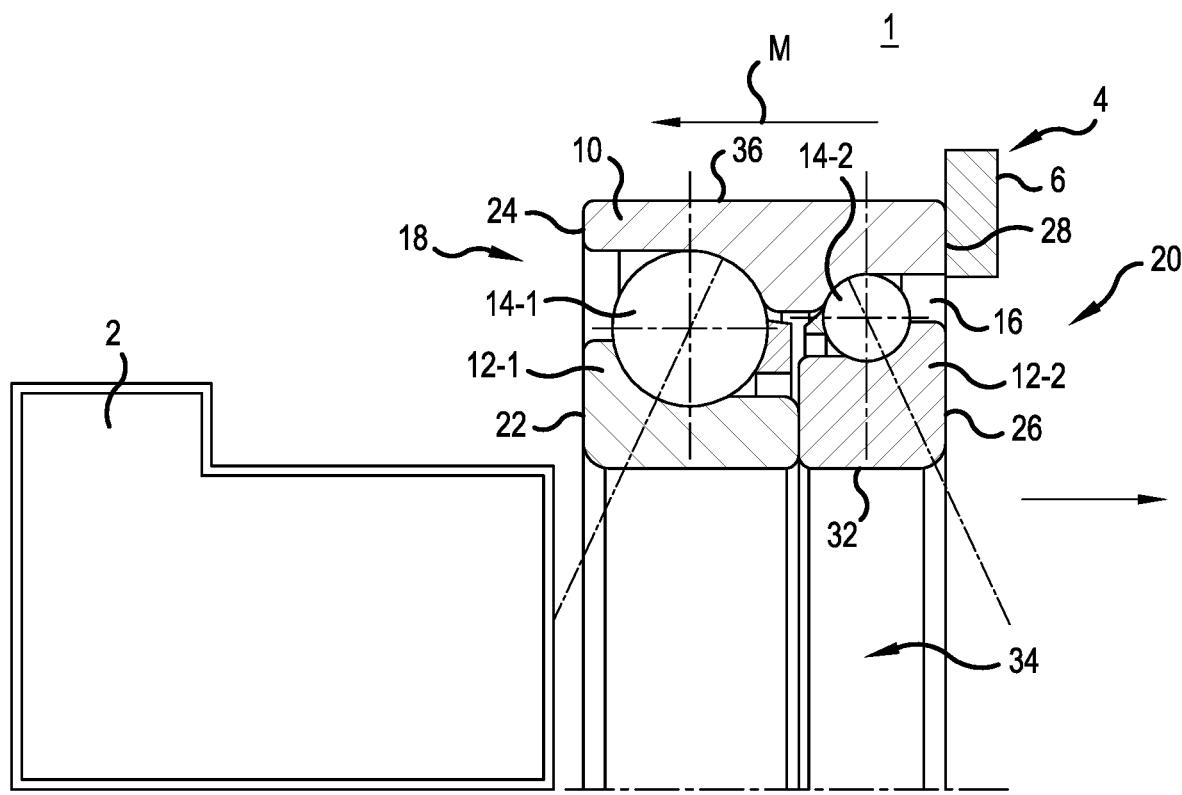
FIG. 2 is a schematic sectional view through a bearing that includes an installation aid device according to a second exemplary embodiment.
Figure 3:
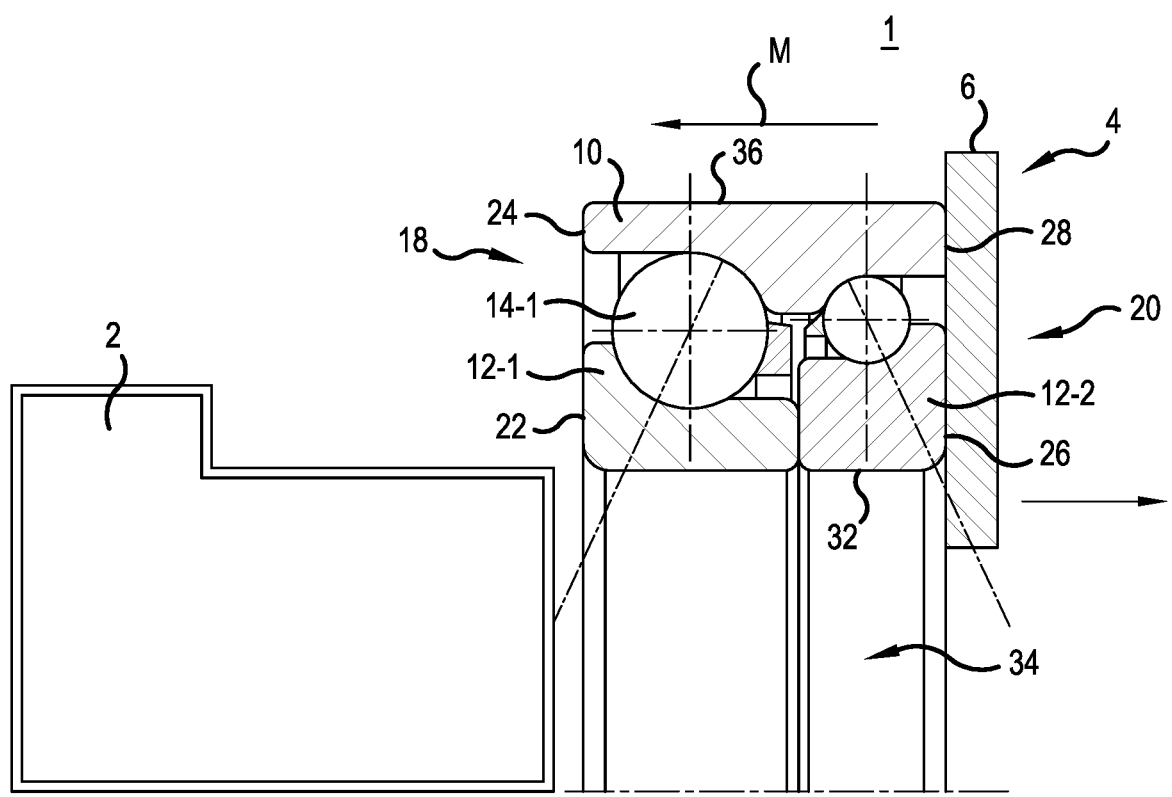
FIG. 3 is a schematic sectional view through a bearing that includes an installation aid device according to a third exemplary embodiment.
Figure 4:
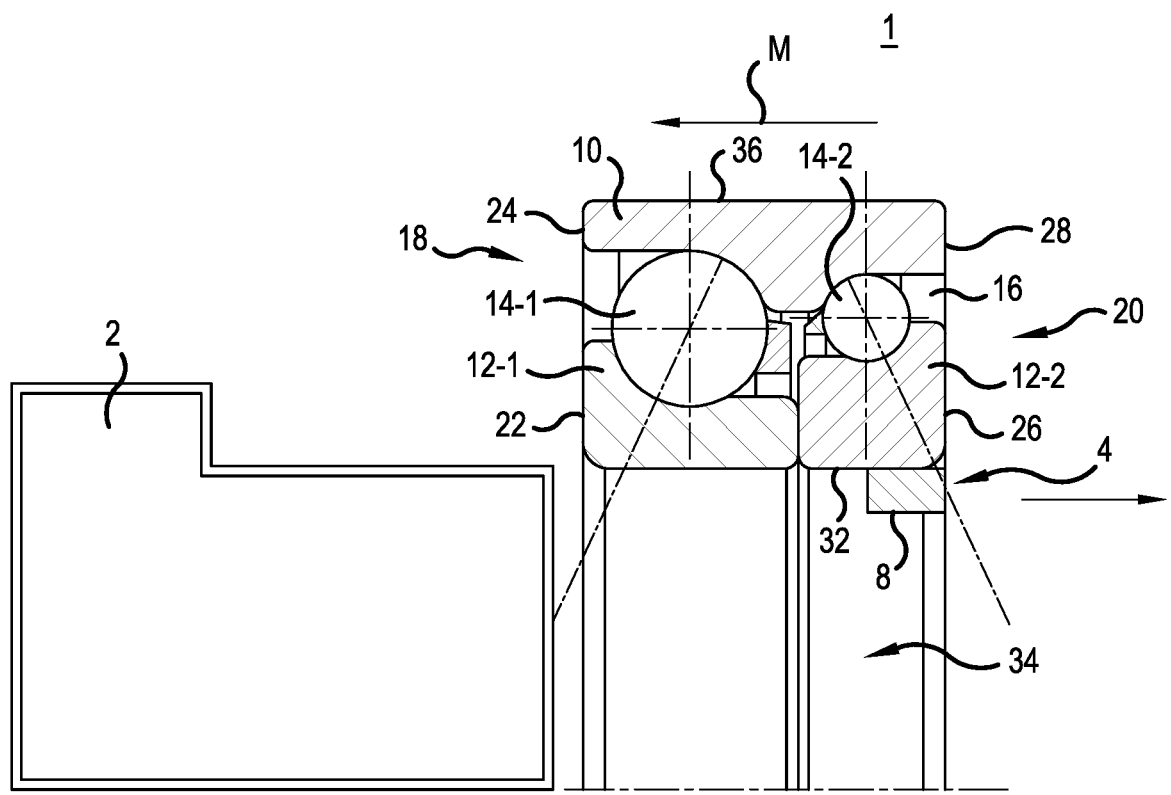
FIG. 4 is a schematic sectional view through a bearing that includes an installation aid device according to a fourth exemplary embodiment.
Figure 5:
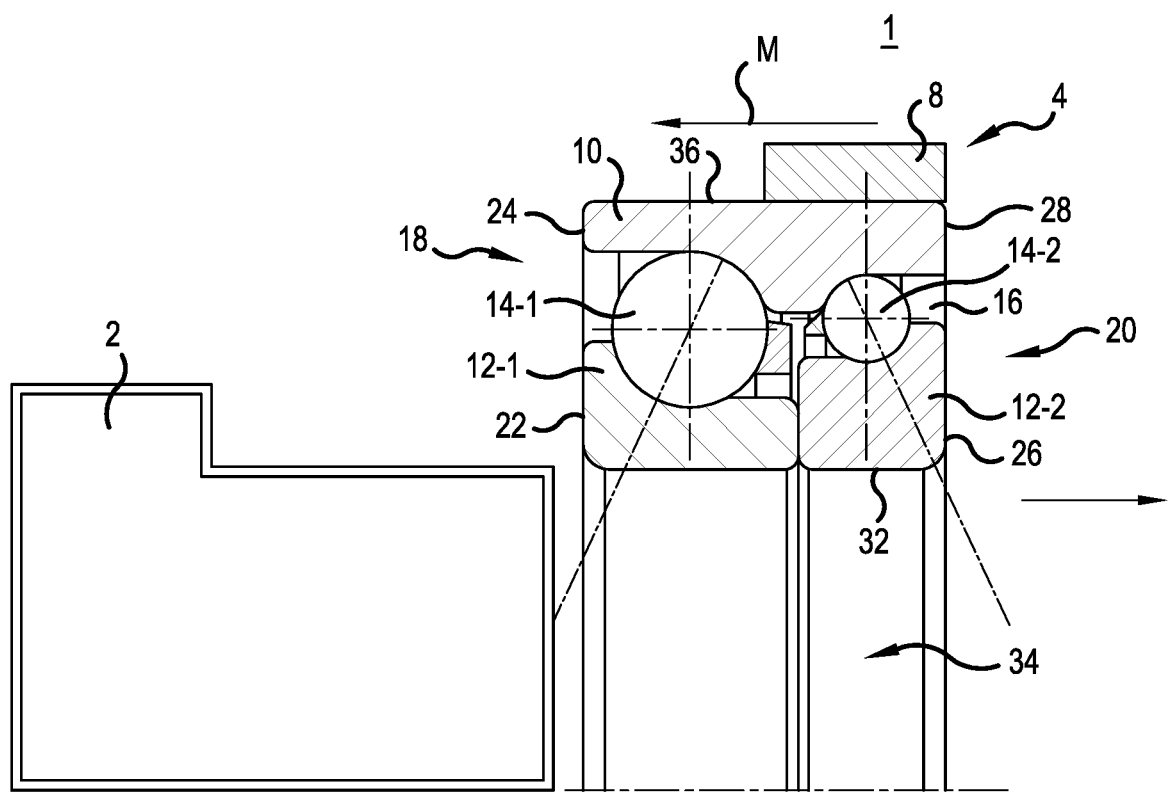
FIG. 5 is a schematic sectional view through a bearing that includes an installation aid device according to a fifth exemplary embodiment.

In the simplest case, which is depicted in FIGS. 1 to 5, the installation aid device includes only the radial leg 6 (FIGS. 1-3) or the axial leg 8 (FIGS. 4-5). Here an exemplary embodiment is nevertheless depicted wherein the bearing 1 is to be mounted on the shaft 2, and thus the radial inner surface 32 is also the installation surface. As depicted in FIGS. 1 and 3, the radial leg 6 of the installation aid device 4 extends along the axial end surface 26 of the radial inner ring 12-2 and protrudes part way over the bore 34 of the inner ring 12-2. The radial leg thus also protrudes beyond the installation surface 32. This has the effect that attaching the bearing, i.e., by its inner ring, onto the shaft 2, is only possible via the installation front side 18, while the bore 34 on the installation rear side 20 is blocked by the radial leg 6.

Alternatively insertion of the shaft 2 into the bore 34 can also be prevented by an installation aid device 4 that includes only one axial leg 8, and is configured, for example, as a hollow or solid cylinder and partially covers the installation surface 32. FIG. 4 shows such an exemplary embodiment.

The same design can of course also be provided at the radial outer surface 36, as depicted for the radial leg in FIGS. 2 and 3, and for the axial leg in FIG. 5. This design is advantageous in particular in an installation aid device 4 that is not intended to block the installation on a shaft in a bore, but rather, for example, to block the installation into a housing.

When positioned correctly, the bearing 1 is pushed onto the shaft 2 until, during the installation, the shaft 2 comes in contact with the radial leg 6 or the axial leg 8 of the installation aid device 4. In order then to completely attach the bearing to the shaft 2, the installation aid device must be removed from the bearing. This can be effected manually, for example, by an operator; however, it is preferred that the installation aid device be releasably attached to the bearing such that it automatically releases during installation of the bearing.

In the embodiment depicted in FIGS. 1 to 3, the release can occur by the radial leg 6 of the installation aid device 4 being, for example, adhered to the bearing, and/or including an attachment device, for example, a clamp or a pin, using which the installation aid device is fixedly clamped in a specifically configured opening on the bearing ring. Instead of an opening provided specifically for this purpose, an already existing opening, such as, for example, screw holes, or the radial space 16 between the inner and outer ring, can also be used for interacting with the attachment device for the releasable attaching of the installation aid device.

If no radial leg 8 is present as, for example, in the hollow cylinders of FIGS. 4 and 5, it is useful in particular that the installation aid device 4 abuts against the radial surfaces with sufficient frictional connection so that a displacing, for example, during a transport, is reliably prevented, but a releasing from the bearing, by overcoming a static frictional force, is possible. An adhesive can of course also be used here in which case sufficient force must be applied against the axial leg 6 to break the adhesive connection.

Instead of attaching an extra attachment opening around the radial leg 6 of the installation aid device 4, or in the case of a bearing in which the shaft 2 or the housing is only partially attached onto the installation surface 32, 36, it can furthermore be advantageous that the installation aid device 4 includes both a radial leg 6 and an axial leg 8 that abuts against one or both radial surfaces 32, 36. Such exemplary embodiments are depicted in FIGS. 6 to 8.

Figure 6:
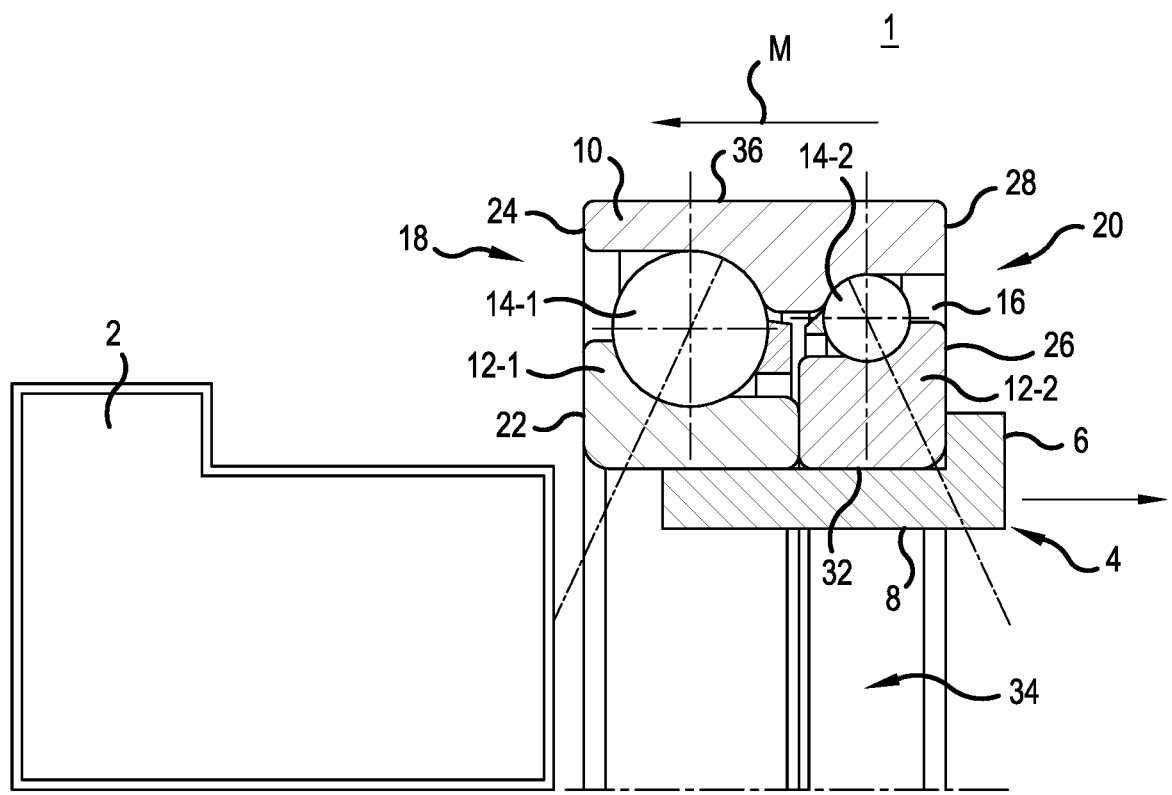
FIG. 6 is a schematic sectional view through a bearing that includes an installation aid device according to a sixth exemplary embodiment.
Figure 7:
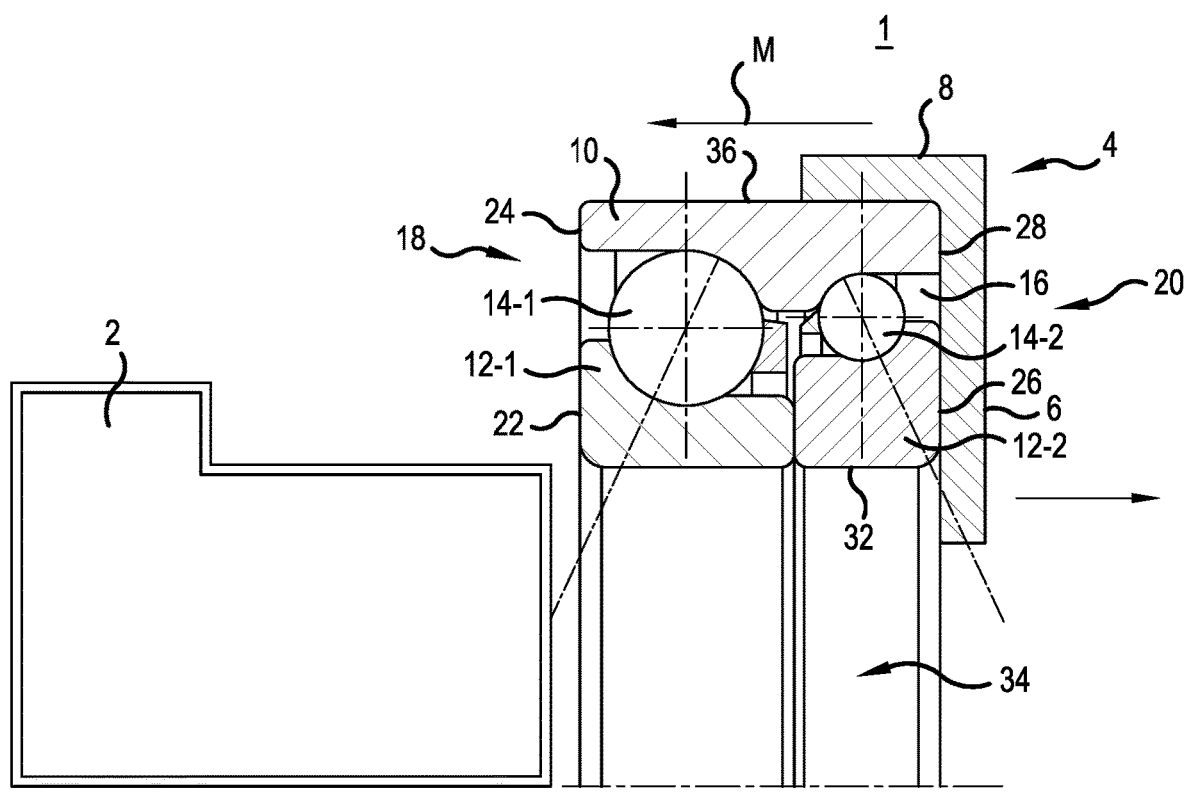
FIG. 7 is a schematic sectional view through a bearing that includes an installation aid device according to a seventh exemplary embodiment.
Figure 8:
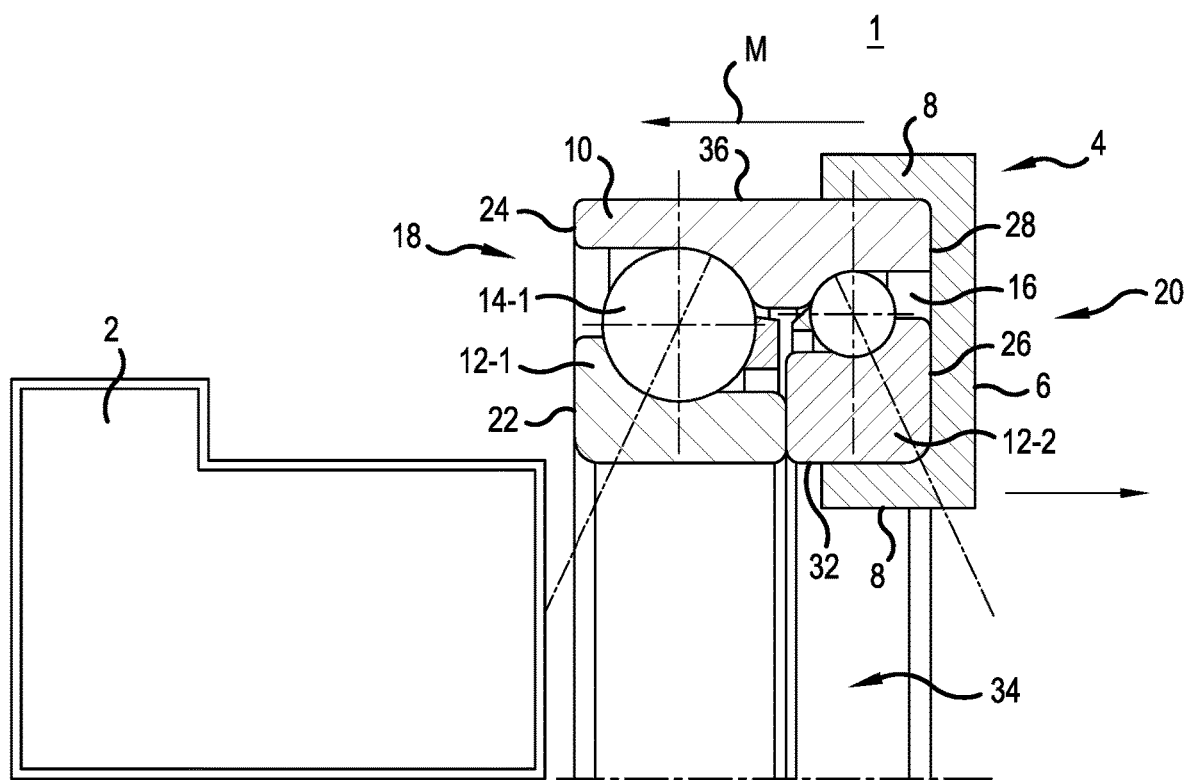
FIG. 8 is a schematic sectional view through a bearing that includes an installation aid device according to an eighth exemplary embodiment.
Figure 9A:
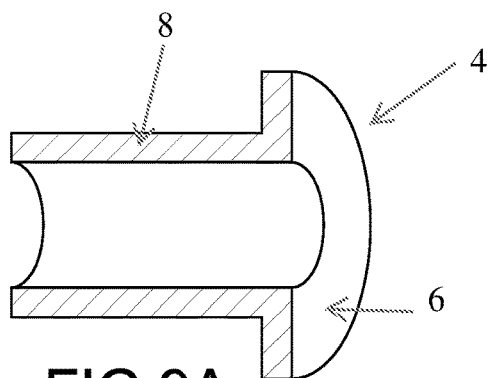
FIGS. 9a-9h are perspective views of installation aid devices having different configurations.
Figure 9B:
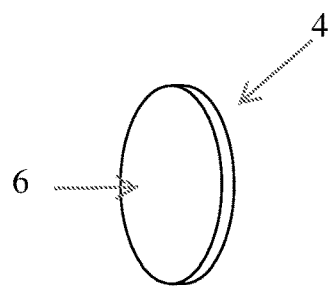
Figure 9C:
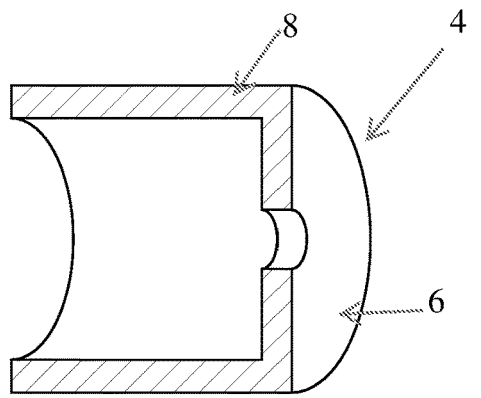
Figure 9D:
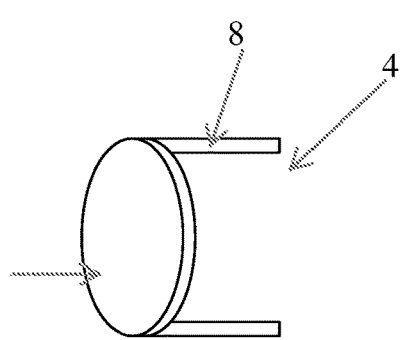
Figure 9E:
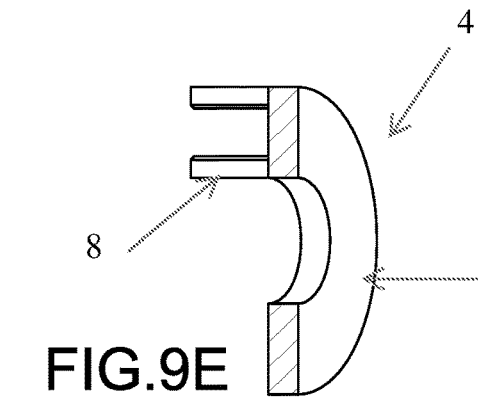
Figure 9F:
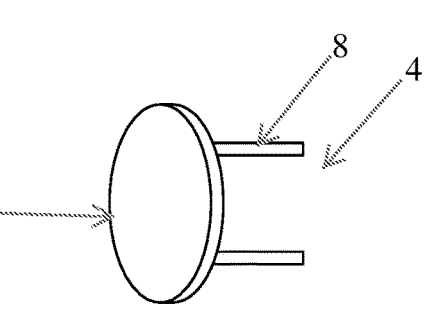
Figure 9G:
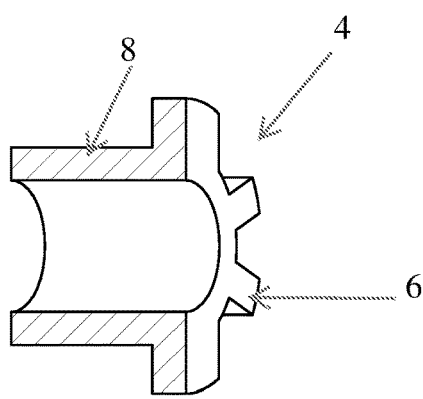

As used herein, the word "leg" refers to structures like the radial leg 6 and the axial leg 8 depicted in FIGS. 6-8 even when only one of the "legs" is present. Thus, for example, leg 6 in FIG. 1 comprises an annular disk (annulus) and leg 8 in FIG. 4 comprises a cylinder. Furthermore, the word "leg" refers both to discrete legs as illustrated for example, in FIGS. 9d, 9e, and 9f and to legs that take the form of cylinders as shown in FIGS. 9a and 9b. That is, the word "leg" is used as a convenient term that describes a structure with an axial extent overlying a radially facing surface and a structure with a radial extent overlying an axially facing surface.

In such embodiments the shaft 2 can already come into abutment against the axial leg 8 significantly earlier during the installation and release the installation aid device 4 by pressing against the axial leg 8. At the same time the axial leg 8 allows for an easy attachment of the installation aid.

Here the axial leg 8 can extend in the bore 34 along the radial inner surfaces 32 or along the radial outer surfaces 36 (see FIGS. 6 and 7), but it is also possible that both the radial inner surface and radial outer surface are enveloped by the axial legs 8 of the installation aid device 4 (see FIG. 8), so that the bearing is enveloped over its radial thickness. It is also possible that only one of the bearing rings is enveloped by the axial leg 8, i.e., for example, only the inner ring 12-2, so that the installation aid device is attached to the bearing inner ring 12-2 like a clip.

Further exemplary embodiments for various designs of the installation aid device 4 are depicted in FIGS. 9a to 9g.

Here it is shown that both the radial leg 6 and the axial leg 8 of the installation aid device can be configured as a one-piece element. This is preferred in particular when the radial leg 6 is configured as a disc that extends at least partially onto the axial end surfaces 26 and/or 28 (see FIGS. 9a-9f). Here the disc can be configured as a one-piece disc that covers the entire bore 24, (see FIGS. 9b, 9d, 9f) or as an annular disc (9a, 9c, 9e).

Furthermore, the axial leg 8 can also be configured as a one-piece element, for example, in the shape of a tube (see FIGS. 9a, 9c, 9g) or in the shape of a disc, i.e., a solid-cylindrical element (see FIG. 9b), which is received in the bore 34 and completely closes it.

Alternatively it is also possible that one or both legs 6, 8 represent discrete elements (see FIGS. 9d, 9e, 9f, 9g).

Figure 9H:
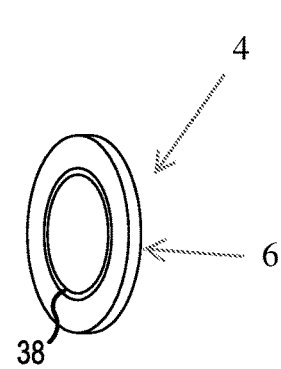

The axial element can also be an elastic, axially projecting annular bead, such as bead 38 illustrated in FIG. 9h, that is configured to be inserted in an elastically deformed manner in an intermediate space between an inner ring and an outer ring of the bearing.

The features shown can of course also be present combined in other ways, or further not-shown designs can be provided.

Due to the radial leg 6 extending radially beyond the radial installation surface, or the axial leg 8 of the installation aid device 4 extending along the radial installation surface, installation of the bearing 1 in the direction opposite the installation direction M is prevented, since the installation opening or the installation surface is blocked.

A second advantage of the present disclosure is that the installation aid device 4 is configured such that during a correct installation the installation aid device 4 is released directly from the bearing without an installer needing to intervene manually. This is achieved by the shaft 2 or the housing finally coming into abutment against the radial leg 6 or against the axial leg 8 during progressive installation, and with further movement in the installation direction the installation aid device 4 is released from the bearing 1 by the shaft 2 or the housing by overcoming friction, breaking an adhesive bond, etc.

Due to this automatic releasing it is not necessary for the installation aid device to be removed prior to the installation, which reliably prevents an incorrect installation. A time- and cost-intensive marking of the bearing itself can also be omitted with the use of such an installation aid device 4.

It is therefore preferred that installation aid device 4 is easily releasable. This can be achieved, for example, via the above-mentioned plug connections or via a jamming of the installation aid device 4 by the axially extending legs 8. However, it is also possible that the installation aid device 4 is attached to the bearing using an easily releasable adhesive.

Furthermore, it is advantageous that the installation aid device 4 be comprised of a material that is easily recyclable and/or is comprised of a recycled material, since such installation aid devices 4 are usually configured as a disposable item and are discarded after installation of the bearing. Here it is advantageous in in particular when the installation aid device is formed from a recycled or a recyclable plastic material, and/or even made from a biodegradable plastic material so that the environment is not further burdened. Here plastic is also simple to bring into any desired shapes so that the manufacturing of the widest variety of installation aid devices is possible. Alternatively the installation aid device can also be produced from a paper-based material, such as, for example, cardboard. A recyclable device can also thereby also be provided.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing installation aids.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing assembly comprising:
an inner bearing ring having a radial inner installation surface and a front axial end surface and a rear axial end surface;
an outer bearing ring;
wherein the bearing is configured to be installed on a shaft in an installation direction, the installation direction being a direction from the rear axial end surface to the front axial end surface,
the bearing assembly further comprising:
an installation aid device having at least one radial leg overlying the rear axial end surface and at least partially protruding radially beyond the radial inner installation surface and at least one axial leg extending inside the inner bearing ring at least partially along the radial inner installation surface such that an installation of the bearing in a direction opposite the installation direction is blocked by the installation aid device.

2. The bearing according to claim 1, wherein the installation aid device is releasably attached to the bearing.

3. The bearing according to claim 1, wherein the at least one axial leg is directly connected to the at least one radial leg.

4. The bearing according to claim 1, wherein
the at least one axial leg comprises two diametrically opposed axial legs.

5. The bearing according to claim 1,
wherein the at least one radial leg is an annulus; and/or
wherein the at least one axial leg is a tubular element.

6. The bearing according to claim 1, wherein the installation aid device comprises a plastic.

7. The bearing according to claim 1, wherein the installation aid device comprises a recycled plastic or a scrap-paper-based material.

8. The bearing according to claim 1, wherein the installation aid device comprises a biodegradable plastic or a cardboard or a paper-based material.

9. The bearing according to claim 1, wherein the bearing is an asymmetric bearing.

10. The bearing according to claim 1, wherein the installation aid device is attached to the bearing by a press fit.

11. The bearing according to claim 1, wherein the installation aid device is adhesively attached to the bearing.

12. The bearing according to claim 1,
wherein the at least one radial leg comprises a disk.

13. The bearing according to claim 1,
wherein the at least one radial leg comprises an annulus.

14. The bearing according to claim 1, wherein the at least one axial leg comprises a tubular member.

15. The bearing according to claim 1, wherein the at least one radial leg comprise an annulus and the at least one axial leg comprises a tubular member.

* * * * *